Dec. 18, 1962 L. D. COBB 3,068,551
METHOD OF ASSEMBLING A SELF-ALIGNING BEARING
Filed Aug. 29, 1958

INVENTOR
LELAND D. COBB
BY Edward H. Goodrich
HIS ATTORNEY

United States Patent Office 3,068,551
Patented Dec. 18, 1962

3,068,551
METHOD OF ASSEMBLING A SELF-ALIGNING BEARING
Leland D. Cobb, Forestville, Conn., assignor to General Motors Corporation, Detroit, Mich., a corporation of Delaware
Filed Aug. 29, 1958, Ser. No. 758,095
4 Claims. (Cl. 29—149.5)

This invention relates to rod end bearings and particularly to a self-aligning rod end bearing and method for making same.

In rod end bearings as commonly used in airplanes and in control mechanisms, it is usual to provide a yoked member in the end of a tug rod with a head which rotatably receives a generally self-aligning ball seated member in which a pin, clevis or other operating member may be pivotally fastened. Usually the ball or its seat has had to be partly cut away in order to install the ball in position thus forming a weakened structure under heavy load or vibrating conditions. Also, it has been proposed to deformably force a pair of ring members into a bore and into binding relation with such a ball to form the seat. However, such a structure has usually created so much friction upon the ball that it could not properly self-align within its seat.

It is, therefore, an object of my invention to provide an improved structure and method of making and assembling a rod end bearing which will be effective in operation and have the desired antifriction self-aligning characteristics required in such bearings.

It is a further object to provide an improved simply constructed self-aligning rod end bearing wherein the parts remain in antifrictional unit-handling relation after assembly.

To these ends and also to improve generally upon devices and methods of this character, this invention consists in the various matters and methods hereinafter described and claimed. In its broader aspects, the invention is not necessarily limited to the specific structures and method of manufacture selected for illustrative purposes in the accompanying drawings wherein FIGURE 1 is a cross sectional view taken longitudinally through my self-aligning structure;

Figure 1:
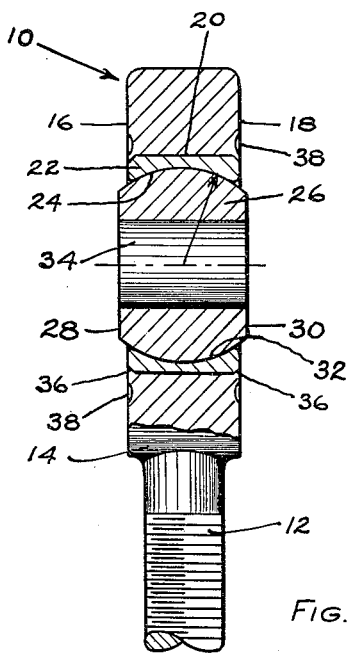
Figure 2:
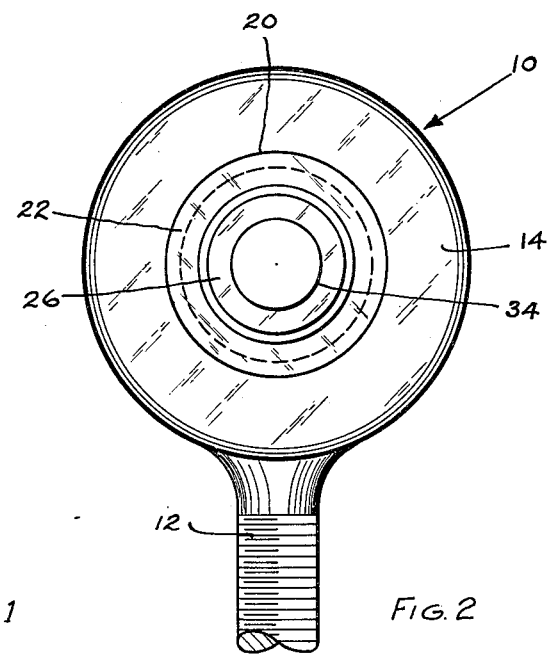
FIGURE 2 is a side elevation of my rod end bearing assembly.
Figure 3:
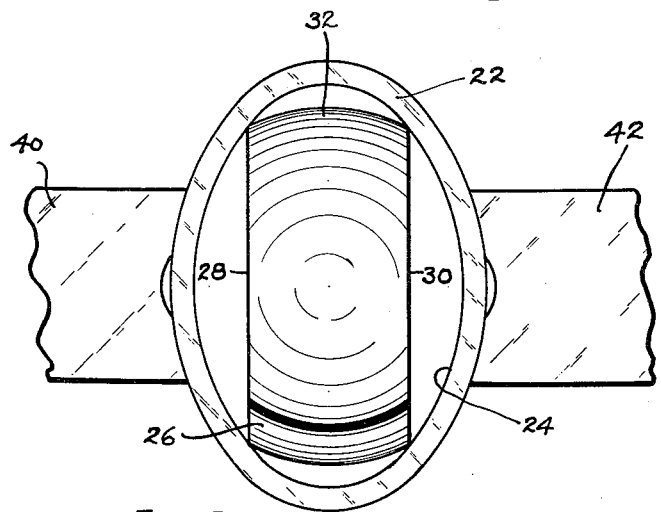
FIGURE 3 is a diagrammatic illustration of my method of bearing assembly.

My rod end bearing, generally indicated at 10, has particular utility in linkages such as in aircraft controls wherein there is need of an antifriction pivotal connection which requires at least a partial degree of universal articulation. As shown, there is provided a threaded shank 12 integrally formed at one side of and preferably radially projecting from a rounded head 14 having opposed side faces at 16 and 18 which may be parallel and which are preferably spaced apart through a distance somewhat greater than the diameter of the shank 12. The head 14 is provided with a transverse through bore 20 in which is pressed a mounting sleeve 22 having an interior parti-spherical seat or face 24 formed about a center lying along the axis of the bore 20 and preferably intermediate of the width of the head 14 between the side faces 16 and 18. A bearing ball member 26 which is slabbed off to provide generally parallel flat end faces 28 and 30 has a spherically contoured periphery 32 seated for a universal slidable and rotary movement against the surface 24 thus providing an antifrictional self-aligning seating of the ball within the sleeve member 22. The end faces 28 and 30 of the ball member 26 are preferably located outwardly and beyond the adjacent end faces 16 and 18 of the head 14 and the ball 26 is transversely through-bored at 34. The radius of the peripheral face 32 is preferably centered along the axis of the bore 34 and is illustrated at the mid point of the length of this bore. The bore 34 may slidably and/or rotatably receive the cross pin carried by a clevis or other suitable member not shown. The outer ends of the sleeve 22 are preferably chamfered at 36 and adjacent portions of the walls 16 and 18 are struck inwardly to overlie this chamfer for securing the sleeve 22 in position within the bore 20.

In assembly, the sleeve member 22 is gripped between the jaws of a vice as indicated at 40 and 42 and deformed to an oval contour but within its elastic limit. Since the radial wall thickness of the sleeve 22 is relatively thin, this sleeve may be subjected to considerable deformation and sufficient to insert the ball member 26 within the longitudinally deformed portion of the sleeve and with the bore 34 located generally at right angles to the major diameter of the now deformed sleeve 22. The jaws are thereafter retracted and the sleeve 22 springs back to its original cylindrical form with the ball periphery matingly seated against the surface 24 for free universal movement. The ball is now angularly oriented through approximately 90° to locate its axis in general alignment with the axis of the sleeve and the ball assembly is thereafter located in the bore 20 with the sleeve press-fitted within the head 14. Various spaced portions of the walls 16 and 18 are then struck inwardly at 38 to overlie the chamfered portions 36 to lock the parts together in unit-handling assembly. With this arrangement, the ball member 26 has a precisely controlled self-aligning seating fit against the entire inner spherical surface 24 of the sleeve 22 thus avoiding any distortion and binding of parts under load.

I claim:

1. The method of making a bearing comprising the steps of forming a ball-shaped bearing member having a central bore with an axial length less than the diameter of said bearing member, forming a mounting sleeve with an internal concaved face of revolution for conformingly embracing the periphery of said ball-shaped bearing member, temporarily deforming the sleeve within its elastic limit to an oval shaped contour, laterally inserting the bearing member within the temporarily deformed sleeve, allowing the sleeve to return to its original tubular contour while orienting the sleeve and ball axes generally longitudinally of each other to locate the ball periphery in universally seated conforming relation against the internal concaved sleeve face, forming a supporting head with a through bore, axially inserting the sleeve within said bore and securing the sleeve within the bore in said head.

2. The method of making a bearing comprising the steps of forming a ball-shaped bearing member having a central bore therethrough with an axial length less than the diameter of said bearing member, forming a cylindrical mounting sleeve with an internal spherical face for matingly receiving the periphery of said bearing member, temporarily deforming the sleeve within its elastic limit to an oval contour, laterally inserting the bearing member within the temporily deformed sleeve with he bore axis disposed transversely of the major axis of the deformed sleeve, allowing the sleeve to return to its original cylindrical contour while orienting the bearing member and sleeve to generally longitudinally align their axes and locating the periphery of said bearing member in universally seated mating engagement with said spherical sleeve face, forming a supporting head with a transverse bore, axially inserting the sleeve within the bore in said head, and securing said sleeve in position.

3. The method of making a bearing comprising the steps of forming a ball-shaped bearing member with flat faces at the ends of a through bore and having a spherical peripheral face whose radius extends from the axis of said bore, forming a cylindrical mounting sleeve of a length less than that of said bore and having an internal spherical face for receiving the periphery of said bearing member in universally seated mating relation, temporarily deforming the sleeve within its elastic limit to an oval contour, laterally inserting the bearing member within the temporarily deformed sleeve while the axis of said bore is disposed transversely with respect to the axis of the sleeve, allowing the sleeve to return to its original shape while orienting the bearing member and sleeve into substantial axial alignment and locating the bearing member periphery in matingly seated universal engagement with the spherical face of the sleeve, forming a supporting head with a seat therein, and mounting the sleeve in said seat.

4. The method of making a bearing comprising the steps of forming a ball-shaped member having flat end faces at the ends of a central through bore and having a spherical periphery with its center located on the bore axis, forming a mounting sleeve with a cylindrical periphery and having an inner spherical face for matingly receiving the spherical periphery of said bearing member, temporarily deforming the sleeve within its elastic limit to an oval contour, laterally inserting the bearing member within the temporarily deformed sleeve while the bore axis is disposed transversely of the axis of the sleeve, allowing the temporarily deformed sleeve to return to its original cylindrical shape while orienting the bearing member and sleeve into generally longitudinal axial relation with each other, with its spherical face matingly seated upon the spherical ball periphery forming a supporting head with a through bore, inserting the sleeve and bearing member assembly in the bore in the head and deforming a portion of the head into locked engagement with the ends of said sleeve.

References Cited in the file of this patent
UNITED STATES PATENTS

| | | |
|---|---|---|
| 1,266,061 | Scoville | May 14, 1918 |
| 2,488,775 | Heim | Nov. 22, 1949 |
| 2,711,352 | Kasko et al. | June 21, 1955 |
| 2,728,975 | Potter | Jan. 3, 1956 |
| 2,804,679 | Tracy | Sept. 3, 1957 |
| 2,885,767 | Barish | May 12, 1959 |
| 2,904,874 | Norton | Sept. 22, 1959 |